United States Patent
Krause et al.

(10) Patent No.: US 8,904,426 B2
(45) Date of Patent: Dec. 2, 2014

(54) PRECONDITIONING AD CONTENT FOR DIGITAL PROGRAM INSERTION

(75) Inventors: Edward A. Krause, Saratoga, CA (US); Peter Monta, Palo Alto, CA (US)

(73) Assignee: RGB Networks, Inc., Sunnyvale, CA (US)

( * ) Notice: Subject to any disclaimer, the term of this patent is extended or adjusted under 35 U.S.C. 154(b) by 974 days.

(21) Appl. No.: 12/487,130

(22) Filed: Jun. 18, 2009

(65) Prior Publication Data

US 2009/0328096 A1 Dec. 31, 2009

Related U.S. Application Data

(60) Provisional application No. 61/133,614, filed on Jun. 30, 2008.

(51) Int. Cl.
| | |
|---|---|
| *H04N 7/10* | (2006.01) |
| *H04N 7/025* | (2006.01) |
| *H04N 7/12* | (2006.01) |
| *H04N 21/845* | (2011.01) |
| *H04N 21/81* | (2011.01) |
| *H04N 21/458* | (2011.01) |
| *H04N 21/44* | (2011.01) |
| *H04N 21/434* | (2011.01) |
| *H04N 21/433* | (2011.01) |
| *H04N 21/234* | (2011.01) |

(52) U.S. Cl.
CPC ..... *H04N 21/23424* (2013.01); *H04N 21/8455* (2013.01); *H04N 21/812* (2013.01); *H04N 21/458* (2013.01); *H04N 21/44016* (2013.01); *H04N 21/434* (2013.01); *H04N 21/4331* (2013.01)
USPC ............................ 725/32; 725/36; 375/240.28

(58) Field of Classification Search
USPC ................ 725/32, 36, 42, 146; 370/498, 509; 348/500; 375/240.28
See application file for complete search history.

(56) References Cited

U.S. PATENT DOCUMENTS

| | | | | |
|---|---|---|---|---|
| 6,529,555 | B1 * | 3/2003 | Saunders et al. | 375/240.26 |
| 6,611,624 | B1 * | 8/2003 | Zhang et al. | 382/232 |
| 6,909,743 | B1 * | 6/2005 | Ward et al. | 375/240.01 |
| 6,983,015 | B1 * | 1/2006 | Saunders et al. | 375/240.1 |

(Continued)

FOREIGN PATENT DOCUMENTS

| | | | |
|---|---|---|---|
| EP | 923243 | A1 * | 6/1999 |
| EP | 1005042 | A2 * | 5/2000 |

OTHER PUBLICATIONS

Wu and Rao, "Digital Video Image Quality and Perceptual Coding", Chapter 18.3—Spatio-Temporal Masking in Video Coding, p. 558, CRC Taylor & Francis Group, 2006.

(Continued)

*Primary Examiner* — Pinkal R Chokshi
(74) *Attorney, Agent, or Firm* — Lipsitz & McAllister, LLC

(57) ABSTRACT

Methods are provided for inserting advertisements or the like and/or to perform grooming functions for a video, audio and/or data stream. Video programming is received in a network stream. Alternate content, such as advertisements, is received in content stream. The content stream is preconditioned to provide an entrance point therein for splicing the network stream to the content stream. Preconditioning of the content stream can also be performed to provide an exit point for splicing back to the network stream when the alternate content (e.g., advertisements) has concluded.

25 Claims, 10 Drawing Sheets

(56) References Cited

U.S. PATENT DOCUMENTS

| | | | |
|---|---|---|---|
| 6,993,081 B1* | 1/2006 | Brunheroto et al. | 375/240.28 |
| 7,031,348 B1* | 4/2006 | Gazit | 370/504 |
| 7,096,488 B1* | 8/2006 | Zhang et al. | 725/105 |
| 7,139,241 B1* | 11/2006 | Gazit | 370/231 |
| 7,254,175 B2* | 8/2007 | Hurst et al. | 375/240.01 |
| 7,962,640 B2* | 6/2011 | Lee | 709/231 |
| 8,069,464 B2* | 11/2011 | Pickens et al. | 725/95 |
| 8,171,511 B2* | 5/2012 | Haberman et al. | 725/34 |
| 8,260,950 B1* | 9/2012 | Bertz et al. | 709/231 |
| 2003/0001977 A1* | 1/2003 | Wang | 348/700 |
| 2009/0003432 A1* | 1/2009 | Liu et al. | 375/240.01 |
| 2009/0133052 A1* | 5/2009 | Badt, Jr. | 725/32 |
| 2010/0014594 A1* | 1/2010 | Beheydt et al. | 375/240.26 |
| 2010/0306403 A1* | 12/2010 | Tan et al. | 709/231 |

OTHER PUBLICATIONS

Girod, "The Information Theoretical Significance of Spatial and Temporal Masking in Video Signals", Proceedings, SPIE, Human Vision, Visual Processing, and Digital Display, vol. 1077, Jan. 1989, pp. 178-187.

* cited by examiner

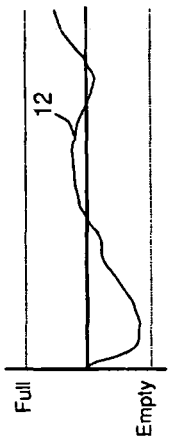
FIGURE 1A: STREAM 1
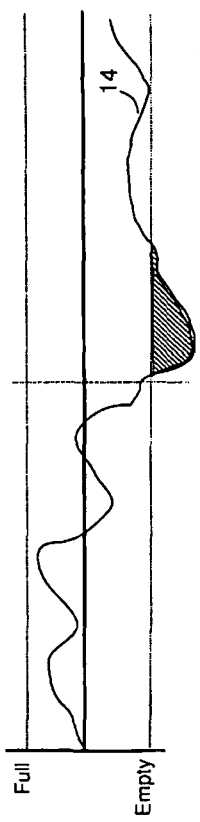
FIGURE 1B: STREAM 2
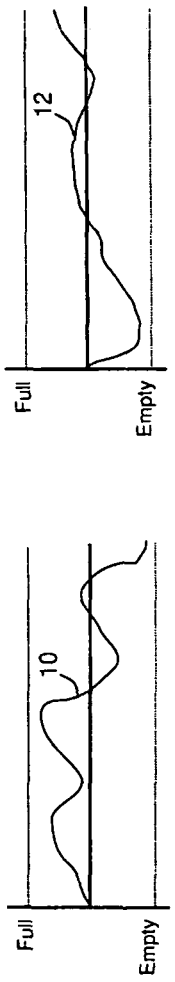
FIGURE 1C: SPLICE FROM STREAM 1 TO STREAM 2

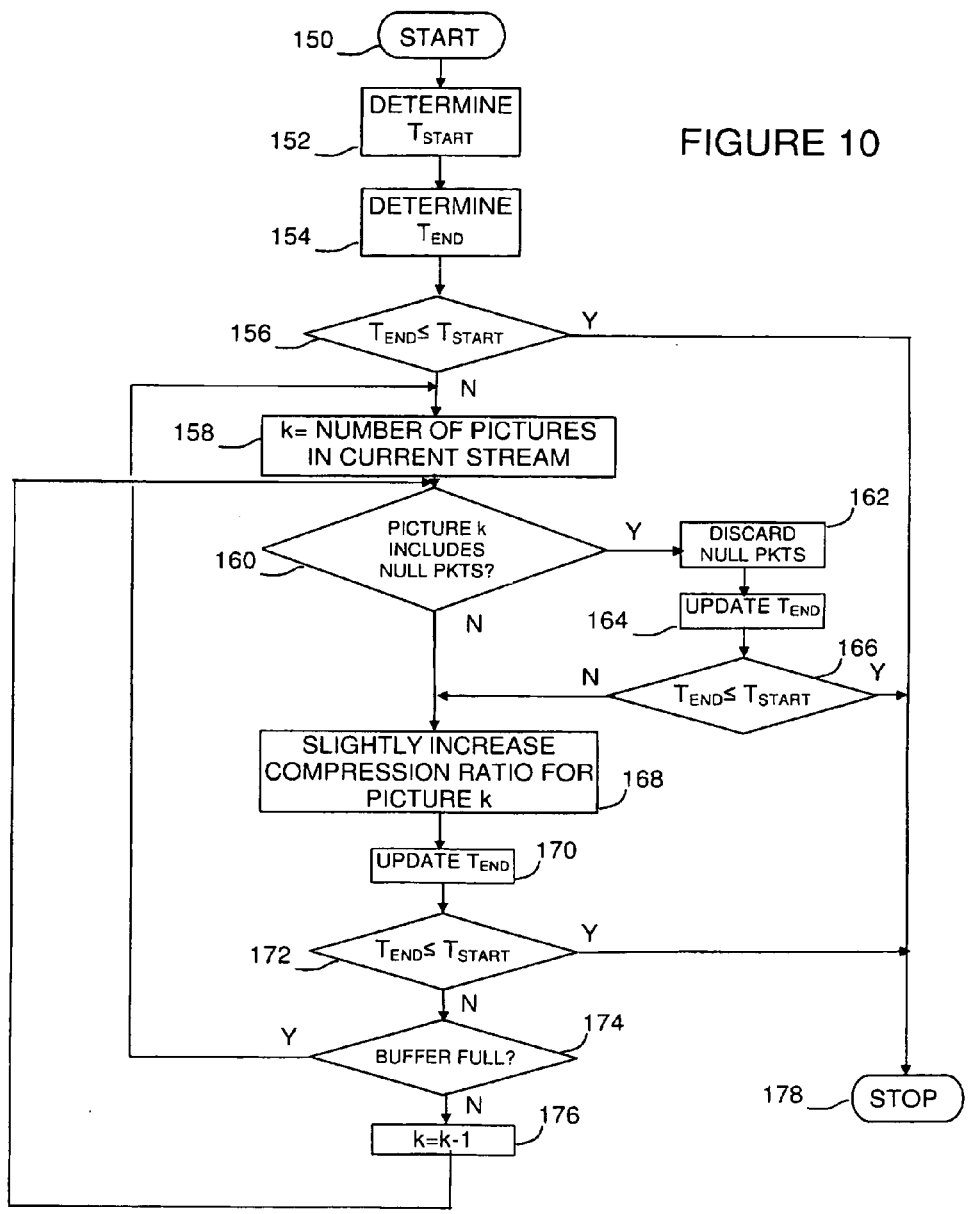

PRECONDITIONING AD CONTENT FOR DIGITAL PROGRAM INSERTION

This application claims priority to and the benefit of U.S. Provisional Patent Application No. 61/133,614 entitled "Preconditioning Ad Content for Digital Program Insertion" and filed on Jun. 30, 2008, which is hereby incorporated by reference in its entirety.

BACKGROUND OF THE INVENTION

The present invention relates to digital video communication, and more particularly to the insertion of advertisements and the like into a digital video stream. The invention is also applicable to the grooming of digital video streams, such as for recombining selected programs from one or more sources.

The process of inserting advertisements into video programming became much more complex after the transition from analog video to compressed digital formats such as MPEG-1 and MPEG-2. Instead of substituting analog waveforms (or digitized pixels) from one signal to another, it became necessary to first identify a suitable exit point in a first compressed digital stream, and then to align this exit point with a suitable entrance point into a second compressed digital stream. In addition, many parameters needed to be added, modified, or replaced, in order to maintain seamless continuity during the splicing transition. In fact, most digital splicing products in existence today will not only modify these parameters, but will also regenerate the entire stream. This is done to insure that the data rate of the resulting stream remains within the limits of the communication channel used to convey the signal from the splicer to one or more receiving devices. This data rate modification process is often referred to as transrating. The combination of splicing and transrating capabilities is particularly advantageous in products designed not only for ad insertion, but for grooming as well.

Grooming refers to the recombination of selected programs from one or more sources. It is an application which typically depends on transrating to match the combined rate of the selected programs with the data rate of the communications channel. In this case, if changes are made to the selection of programs, or if advertisements are inserted into one or more of these selected programs, then the transrating process will automatically insure that the capacity of the communication channel is never exceeded.

In some applications, the use of transrating may not be justified or even possible. For instance, transrating cannot be applied to encrypted digital programs. In other cases, the programs may be in the clear (not encrypted) and the data rate may be constant and known in advance. Furthermore, it may be known that the capacity of the communications channel is sufficient to accommodate a fixed number of these constant bit rate programs. Normally, in such circumstances it would be safe to assume that there is no need for transrating. The problem, however, is that data rate spikes can be introduced when substituting alternative content into one or more programs, even though the data rate of the new content may be constant and of the same rate as the content it replaces. To understand these transient rate variations, it is useful to model the fullness of the buffer which exists in the receiving devices used to decode and reproduce the video and audio signals.

FIG. 1A shows the fullness of the receiver buffer while receiving a first stream 10 and FIG. 1B shows the fullness of the buffer while receiving a second stream 12. FIG. 1C shows the resulting buffer fullness after a splicer implements a transition from the first stream 10 to the second stream 12. As can be seen, the transition is initiated at the end of the first stream ("Stream 1") and continues with the beginning of the second stream ("Stream 2"). Note that the buffer becomes empty shortly after the splice occurs, causing the decoder to be starved of data as indicated by the cross-hatched area of the combined stream 14. The result is a disruption in the presentation of video (or audio). In this case, it is due to the nearly empty state of the buffer at the end of Stream 1, followed immediately by a high drain rate at the output of the buffer starting at the beginning of Stream 2.

Transrating could have prevented this disruption by reducing the data rate of Stream 1 just prior to the splice point and by continuing to reduce the data rate of Stream 2 immediately after the splice was executed. However, the cost of transrating implementations applicable to advanced compression formats can be quite high, and it would be advantageous to avoid this cost even in cases where the streams are in the clear and the transrating option still exists. An example of such an advanced compression format is the H.264 video compression standard, which is equivalent to MPEG-4 Part 10, or MPEG-4 AVC (for Advanced Video Coding). MPEG stands for the Moving Picture Experts Group, which has promulgated a set of standards for the compression of digital video and audio data as well known in the art.

It would be advantageous to provide an alternative to transrating that is well suited to applications involving the insertion of advertisements into encrypted programs. It would be further advantageous to provide such a system and methods that involve preconditioning of alternate content, such as an ad, and can be applied either at the time of content origination at the encoder, or at a later time using an independent off-line process. It would be still further advantageous if once processed, the alternate content (e.g., ads) could be encrypted if necessary. It would also be advantageous if the network streams (e.g., video programming) into which the alternate content is to be inserted do not need to be modified and can be assumed to be encrypted. The present invention provides systems and methods having these and other advantages.

SUMMARY OF THE INVENTION

A method for inserting content into video programming is provided, in which the video programming is received in a first video stream and content to be inserted (e.g., one or more advertisements) is received in a second video stream. The second video stream is preconditioned to provide an entrance point in the second video stream for splicing the first video stream to the second video stream.

In an illustrated embodiment, where the content comprises a plurality of successive pictures, the preconditioning step limits a maximum size of a first picture of the content. The preconditioning will more typically limit the maximum size of a sequence of pictures of the content.

The sequence of pictures can comprise a set of consecutive pictures of the second video stream in a predetermined decoding order. The maximum size of the sequence of pictures can be determined from a number of picture display intervals "T" required to display the sequence in a presentation order and an available data rate "r" for transmitting the sequence. The maximum size of the sequence can be updated after each successive picture and enforced by compressing the next picture of the sequence.

The preconditioning step can be halted once an occupancy level of a buffer receiving the content is built up to a level that is likely to avoid at least one of an underflow and overflow condition during subsequent processing.

The content can comprise a plurality of successive pictures, where each successive picture is one of an intra-coded (I) picture, a predicted (P) picture, or a bi-directional (B) picture. The preconditioning step can comprise the steps of converting at least one B-picture to a P-picture following a first I-picture at the entrance point, and limiting the maximum size of a sequence of pictures of the content, where the sequence includes the first I-picture and the P-picture converted from the B-picture. Typically, a plurality of B-pictures will be converted to P-pictures following the first I-picture.

In another embodiment, instead of converting B-pictures to P-pictures during the preconditioning step, the encoder can be configured to produce P-pictures instead of B-pictures at the start of the content stream.

When the content comprises, for example, television ads ("commercials"), multiple content streams will usually be inserted before returning to the network video programming. In this case, the second video stream can comprise a succession of different content streams.

A method is also provided for inserting content into video programming without modifying the video programming. The video programming is received in a first video stream, the content is received in a second video stream, and an exit point is provided in the second video stream. In particular, the first video stream is spliced to the second video stream to substitute the content (e.g., advertising) for the video programming (e.g., a television program). The second video stream is preconditioned to provide the exit point. The second video stream is then spliced to the first video stream at the exit point in order to return to the video programming at a conclusion of the content.

The spliced video streams can be communicated to a receiver, which temporarily stores data from the spliced video streams in a buffer. The preconditioning step can establish the exit point based on an amount of time sufficient to substantially fill the buffer with an end portion of the content immediately prior to starting the decoding of a first picture of the first video stream. The second video stream is spliced to the first video stream commencing with the decoded first picture. In one embodiment, the "amount of time" deemed sufficient to substantially fill the buffer is constrained to not exceed a predetermined maximum value.

The preconditioning step can also include the step of determining whether the end portion of the content is likely to overflow the buffer prior to starting the decoding. If so, the end portion of the content is recompressed to reduce the amount of data therein to an amount that will not overflow the buffer.

Typically, multiple content streams (e.g., a series of commercials) will be inserted before returning to the video programming in the first video stream. In this case, the second stream can comprise a plurality of different content streams.

The methods just described can also include the step of preconditioning the second video stream to provide an entrance point therein for splicing the first video stream thereto.

BRIEF DESCRIPTION OF THE DRAWINGS

FIG. 1A is a diagram illustrating the fullness of a receiver buffer while receiving a first data stream;

FIG. 1B is a diagram illustrating the fullness of the receiver buffer while receiving a second data stream;

FIG. 1C is a diagram illustrating the resulting buffer fullness after a splicer implements a transition from the first data stream to the second data stream;

FIG. 10 is a third flowchart detailing an example of software that can be used to implement the invention.

DETAILED DESCRIPTION OF THE INVENTION

Although the invention is described with multiple references to the process of ad insertion, it should be realized that the solution is equally applicable to grooming applications where splicing occurs between video streams consisting of arbitrary unrelated video content of limited or unlimited durations.

In accordance with one embodiment of the invention, the entrance point in a first video stream is conditioned for the insertion of a second video stream. Typically, the second stream will comprise one or more advertisements ("commercials") or the like to be shown with a video program (e.g., television program) carried by the first stream. Where a plurality of ads or the like are to be inserted, the second video stream can, for example, comprise a succession of different content streams. In such an embodiment, each of the different content streams can correspond to a different commercial.

Figure 2:
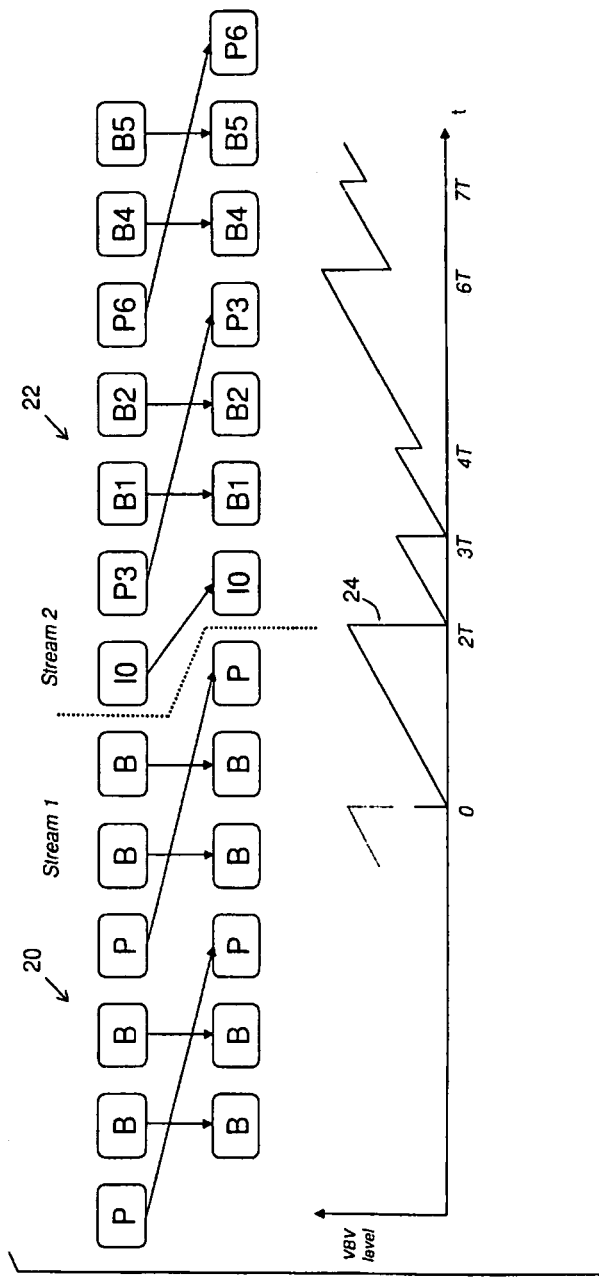
FIG. 2 is a diagram showing a first stream (e.g., a network stream) spliced to a second stream (e.g., an ad stream), together with a Video Buffer Verifier (VBV) model representation of the receiver buffer fullness level.

FIG. 2 represents an example of "entrance point conditioning" in accordance with the invention for the splicing of Stream 1 to Stream 2. In the digital data stream (e.g., video and/or audio) splicing example of FIG. 2, stream 20 ("Stream 1") is spliced to stream 22 ("Stream 2"). The spliced stream is shown in decoding order (P, B, B, P, B, B, I0, P3, B1, B2, P6, B4, B5) at the top of the figure, and in presentation order (B, B, P, B, B, P, I0, B1, B2, P3, B4, B5, P6) below. The decoding order is the same as the order in which the compressed images are transmitted, while presentation order reflects the reordering of certain frames at the decoder to restore the original sequence of displayed images. Note that the presentation time (indicated by the arrows in the figure) is the same as the decoding time in the case of B pictures, while the presentation time of I and P pictures is delayed in order to align with the decoding time of the next I or P picture in the sequence. Also note that the assumption that a B picture can be decoded and displayed at the same time instant is an idealization and in practice there will always be some delay after decoding starts before presentation can occur. In the case of MPEG-2, this idealization is enforced and the encoder is constrained to derive presentation times for I, P, and B pictures based on the decoding times as shown in FIG. 2. In the case of H.264, it is common to delay the presentation times by an additional frame interval. However, the following discussions do not depend on whether this additional delay is considered.

The fullness of the buffer used for receiving the spliced bit stream is shown at the bottom of FIG. 2. Unlike the buffer fullness images shown in FIG. 1, this version illustrates the Video Buffer Verifier (VBV) model that is assumed to be representative of all receivers tuned to the same signal and is relied upon when testing for overflows or underflows in compliant receivers. The model assumes that each picture (access unit) is removed from the buffer in its entirety at the instant specified by a corresponding decoding time stamp (DTS). This is the reason for the instantaneous reductions in buffer fullness occurring at regular intervals. The size of each instantaneous reduction is determined by the size of the compressed representation of the particular picture. Generally, the I-pictures are compressed less efficiently than the P- and B-pictures and will therefore be associated with the largest buffer adjustments.

An I-picture, or "intra-coded picture" is in effect a fully-specified picture. P-pictures and B-pictures hold only part of the image information, so they need less space to store than an I-picture, and thus improve video compression rates. In particular, a P-picture or "predicted picture" holds only the changes in the image from the previous picture. A B-picture or "bi-directional picture" saves even more space by using differences between the current picture and both the preceding and following pictures to specify its content. Pictures that are used as a reference for predicting other pictures are referred to as reference pictures. The terms I-picture, P-picture and B-picture are often referred to in the art as I-frame, P-frame and B-frame, respectively.

If we assume that Stream 1 and Stream 2 have been compressed independently to the same target bit rate, then it would be desirable to constrain the attributes of Stream 2 in such a way that it may be inserted into any stream without risking an underflow of the VBV buffer. Note that overflows do not need to be considered since the splicer is able to delay streaming when necessary for overflow prevention. Although we assume that we do not know any of the attributes of Stream 1, which may be encrypted, we also assume that we still have access to the decoding and presentation time stamps. The parameters of decoding time stamps (DTS) and presentation time stamps (PTS) are described, for example, in the MPEG-2 specifications well known to those skilled in the art. Briefly, the PTS is a metadata field in an MPEG-2 transport stream that is used to assist the decoder in presenting programs on time, at the right speed, and with synchronization. The PTS periodically compares (and readjusts, if necessary) the program presentation time with the Program Clock Reference ("PCR") that is also transmitted in the transport stream. The DTS indicates the time at which data should be instantaneously removed from the receiver buffer and decoded.

Although each possible selection of content for Stream 2 will result in different VBV occupancy levels, it can still be ascertained that if Stream 2 is not sent, then the VBV buffer will become empty at the instant corresponding to the DTS of the last picture of Stream 1. In FIG. 2, this instant occurs when t=0, as seen on timeline 24. Therefore, a worst-case assumption would be that the buffer is full just prior to t=0. Although this assumption is not realistic and a reasonable bound on the size of this last B picture could be imposed instead, this worst-case assumption is accepted in order to simplify the description of the present invention. If an assumption is made that the occupancy level transitions from full to empty when t=0, then it can also be assumed that transmission of Stream 2 will be delayed until this time, and therefore analysis of the VBV buffer can begin now that the starting condition has been resolved.

During the interval from t=0 to t=T, where T is the picture display interval (for example 1/30 second), the receiver will be displaying the last B picture of Stream 1. During the next interval from t=T until t=2T, the receiver will be displaying the last picture of Stream 1 (in this case a P picture transmitted out of order). As seen from FIG. 2, the first picture of Stream 2 (I0) is not displayed until t=2T. As with B pictures, the same idealization can be assumed where display can begin as soon as the entire image has been received. Clearly, if the entire picture I0 can be transmitted during the interval from t=0 until t=2T, then it will arrive in time to prevent the buffer from underflowing. If it is assumed that the data rate available for transmitting the signal is r, then the maximum size of picture I0 ($N_{I0}$) becomes bounded as follows:

$$N_{I0} \leq 2Tr \quad (1)$$

If Stream 2 is compressed to an average data rate r, then this will be twice the average picture size. However, since I pictures are compressed without the use of motion compensated inter-frame prediction, they will tend to be quite a bit larger than the average picture. In many cases, they will tend to be more than twice the average picture size, and therefore the compression ratio will need to be increased in order to insure that this constraint is met. This can be enforced during the preprocessing step.

The next picture to be displayed is B1; however, B1 relies not only on picture I0 as a reference picture, but P3 as well. This means that both P3 and B1 must be decoded before B1 is displayed at time 3T. Therefore a constraint is imposed on the combined size of the three pictures which must be decoded during the interval from t=0 to t=3T, namely:

$$N_{I0} + N_{P3} + N_{B1} \leq 3Tr \quad (2)$$

The constraints become easier after this:

$$N_{I0} + N_{P3} + N_{B1} + N_{B2} \leq 4Tr \quad (3)$$

$$N_{I0} + N_{P3} + N_{B1} + N_{B2} + N_{P6} + N_{B4} \leq 6Tr \quad (4)$$

$$N_{I0} + N_{P3} + N_{B1} + N_{B2} + N_{P6} + N_{B4} + N_{B5} \leq 7Tr \quad (5)$$

Each successive constraint can be enforced by recompressing the next picture of the sequence. Once the buffer occupancy level builds up to the same point where it would have been under original encoding assumptions, then no further adjustments are needed. In almost all cases, this equality of buffer levels occurs by the time that the first Group of Pictures (GOP) has been completed. The concept of a GOP is defined in the MPEG-2 specification, and is well known to those skilled in the art. Generally, a GOP is a group of successive pictures within an MPEG-coded video stream.

From constraints (1) and (2) above, it can be seen that two additional pictures must be transmitted during the interval from t=2T to t=3T. The intention is to display B1 when t=3T; however, B1 cannot be reconstructed without first reconstructing reference picture P3. If the rules of MPEG-2 are followed and it is assumed that B1 will not serve as a reference for other pictures, then it can be concluded that the bits expended for the reproduction of B1 will be of no value when considering the goal of restoring full video quality as soon as possible. Typically, the use of B pictures is well justified when it is possible to allocate additional bits to the reference frames which are relied upon for reconstruction of the B pictures. However, due to constraint (1), and constraint (2) in particular, the quality of the first reference frames (I0 and P3) will be somewhat degraded.

Figure 3:
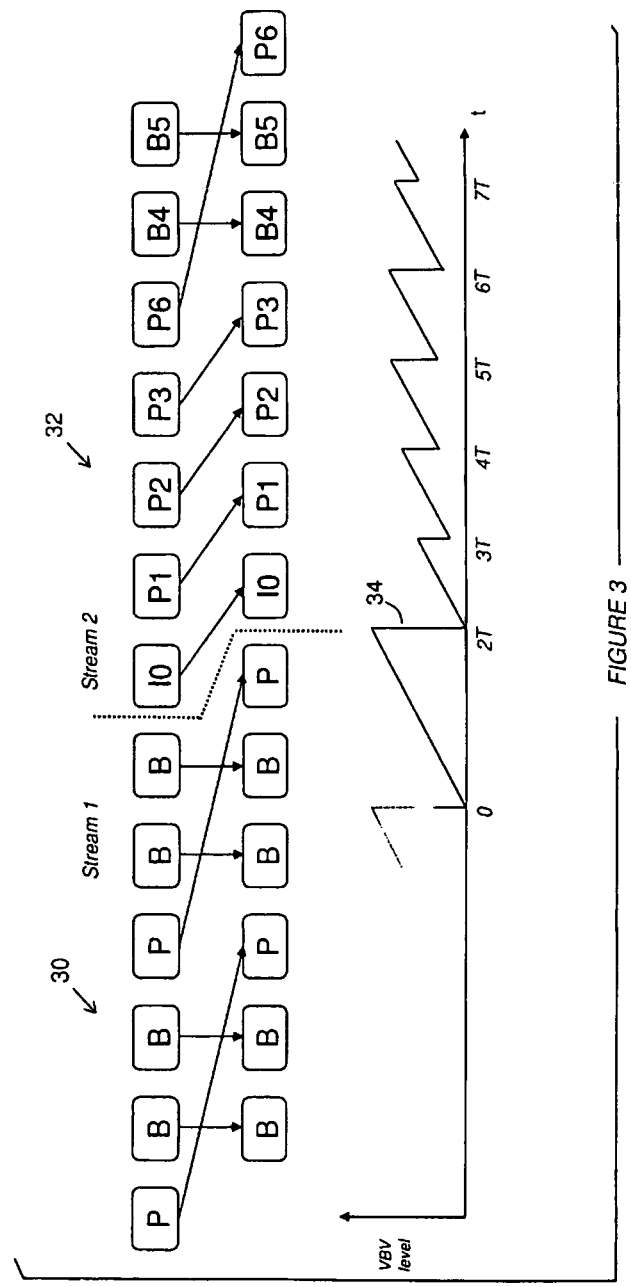
FIG. 3 is a diagram showing said first stream spliced to a second stream, together with a Video Buffer Verifier (VBV) model representation of the receiver buffer fullness level, where the second stream is processed to convert B-pictures to P-pictures prior to splicing.

For this reason, and to relax the requirement imposed by constraint (2), it is advantageous to convert the first pictures following the I frame to simple P pictures as shown in FIG. 3. FIG. 3 illustrates how the video programming stream 30 ("Stream 1") is spliced to the content stream 32 ("Stream 2") along timeline 34. In this example, B1 of FIG. 2 has been converted to P1 and B2 has been converted to P2. P3 has also been regenerated in order to depend on P2 as a reference instead of I0. Each of these P pictures will introduce an incremental improvement in video reproduction accuracy. Of the new constraints listed below, note that (2B), (3B), and (4B) are not only better suited to this incremental improvement policy than previous constraints (2) and (3), but they are also easier to achieve:

$$N_{I0} \leq 2Tr \quad (1B)$$

$$N_{I0}+N_{P1} \leq 3Tr \quad (2B)$$

$$N_{I0}+N_{P1}+N_{P2} \leq 4Tr \quad (3B)$$

$$N_{I0}+N_{P1}+N_{P2}+N_{P3} \leq 5Tr \quad (4B)$$

$$N_{I0}+N_{P1}+N_{P2}+N_{P3}+N_{P6}+N_{B4} \leq 6Tr \quad (5B)$$

$$N_{I0}+N_{P1}+N_{P2}+N_{P3}+N_{P6}+N_{B4}+N_{B5} \leq 7Tr \quad (6B)$$

The previous examples have assumed a simple GOP structure where M (one plus the number of B pictures between reference picture pairs) is equal to 3. This is the setting that is most commonly used in practice. However, M may be increased arbitrarily or reduced to a value of 2, and this will not affect the form of the constraints or the ability to meet them. If M=1 (no B pictures at all), then the constraints need not be tightened as long as the total latency from encoder input to decoder output remains the same. Note that the latency cannot be reduced without sacrificing the ability to seamlessly transition from the M=1 setting to other settings where B pictures are introduced. An example of seamless transitions between settings of M=1 and M=3 was provided previously with reference to FIG. 3.

Note also that in some cases, pictures are encoded as fields instead of frames. Sometimes this is done without altering the GOP structure. For example, a reference may be comprised of two pictures encoded as fields, and there may be four B-pictures (two sets of field pairs) between each reference pair. This does not affect the analysis or conclusions set forth herein.

Another reason to modify the GOP structure is to accommodate random access points. Random access points refer to points in the stream where a splice may be performed. An I frame must always be present at a splice entrance point. Although the requirements for exit points are less strict, it is always safe to assume that a clean exit is possible at the instant immediately preceding a random access point.

Figure 4:
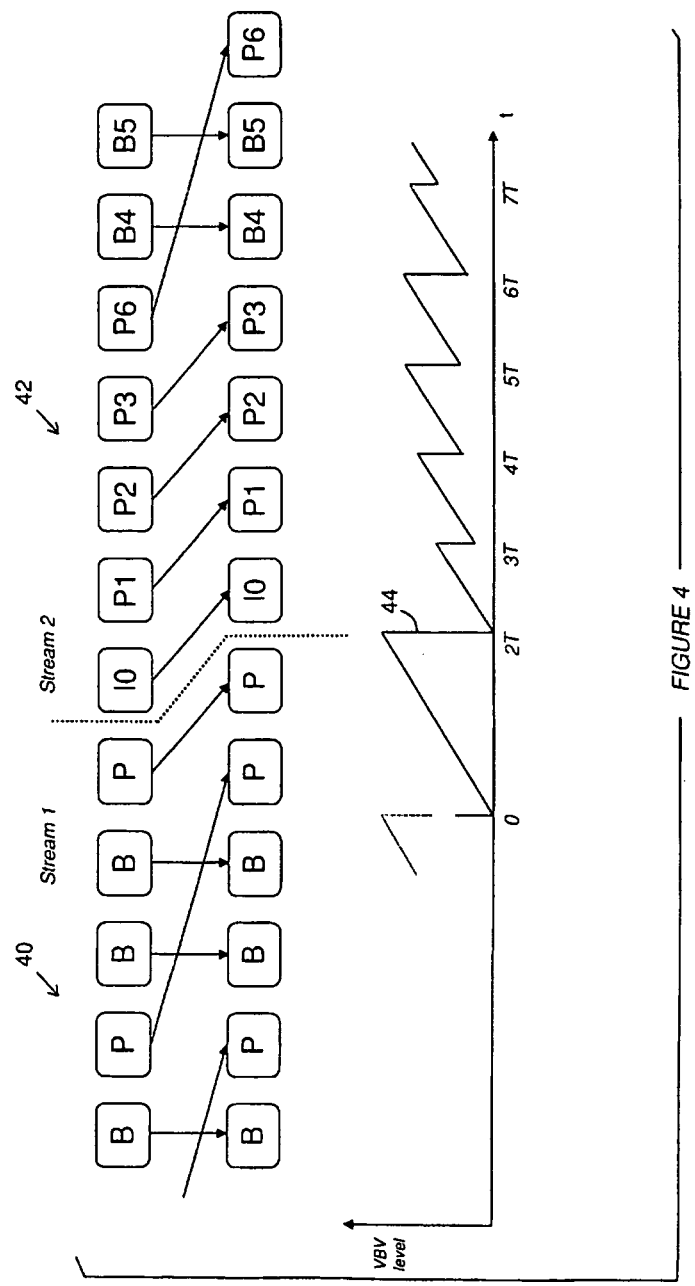
FIG. 4 is a diagram showing a first stream spliced to a second stream, together with a Video Buffer Verifier (VBV) model representation of the receiver buffer fullness level, where the exit from the first stream is delayed by one picture interval relative to the exit point shown in FIG. 3.

FIG. 4 shows a transition from video programming stream 40 ("Stream 1") to content stream 42 ("Stream 2") along timeline 44. As can be seen, the exit from Stream 1 has been delayed by one picture interval relative to the exit point in FIG. 3. In this case, the last picture of Stream 1 was changed from a B picture to a P picture since we cannot use backwards prediction across a splice point. As before, we assume that the VBV buffer is empty at the time corresponding to the DTS of the last picture of Stream 1. This time instant occurs two display intervals before the first picture of Stream 1 (I0) must be displayed. Therefore, buffer occupancy levels while sending Stream 1 will remain identical to the levels observed in the example of FIG. 3 and the same constraints (1B) through (6B) will remain valid.

Figure 5:
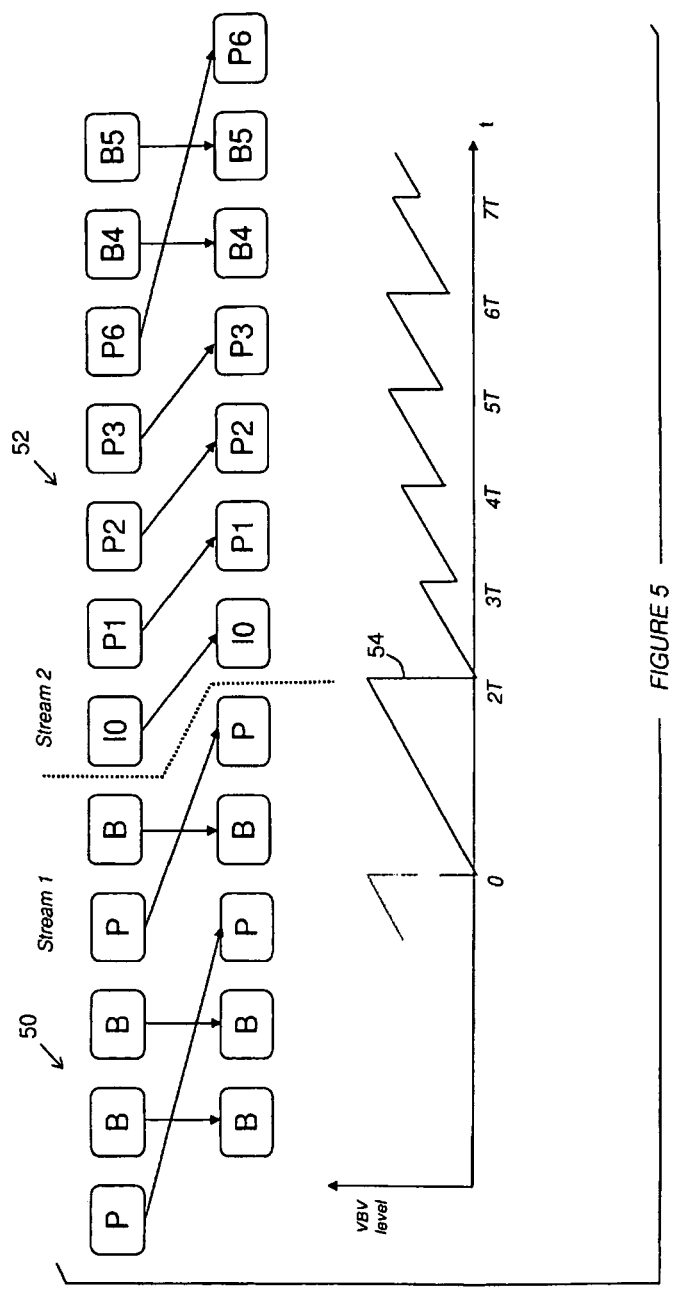
FIG. 5 is a diagram showing a first stream spliced to a second stream, together with a Video Buffer Verifier (VBV) model representation of the receiver buffer fullness level, where the first stream exit point is delayed by two picture intervals relative to the exit point shown in FIG. 3.

FIG. 5 illustrates an example where the exit point has been delayed by two picture intervals relative to the exit point in FIG. 3. In this case, the extra pictures are accommodated by switching from M=3 to M=2 at the end of video programming stream 50 ("Stream 1"). Note that the VBV buffer analysis during transmission of Stream 1 remains unaffected by this change, and the same constraints (1B) through (6B) continue to apply. Also shown in the figure are content stream 52 ("Stream 2") and timeline 54.

The VBV buffer must be prevented from underflowing, not only when splicing from the network stream (e.g., video programming stream) to alternate content (e.g., an ad), but also when returning from the alternate content back to the network stream. As before, this requirement can be insured by preconditioning the alternate content, while the network content remains unconstrained.

Figure 6:
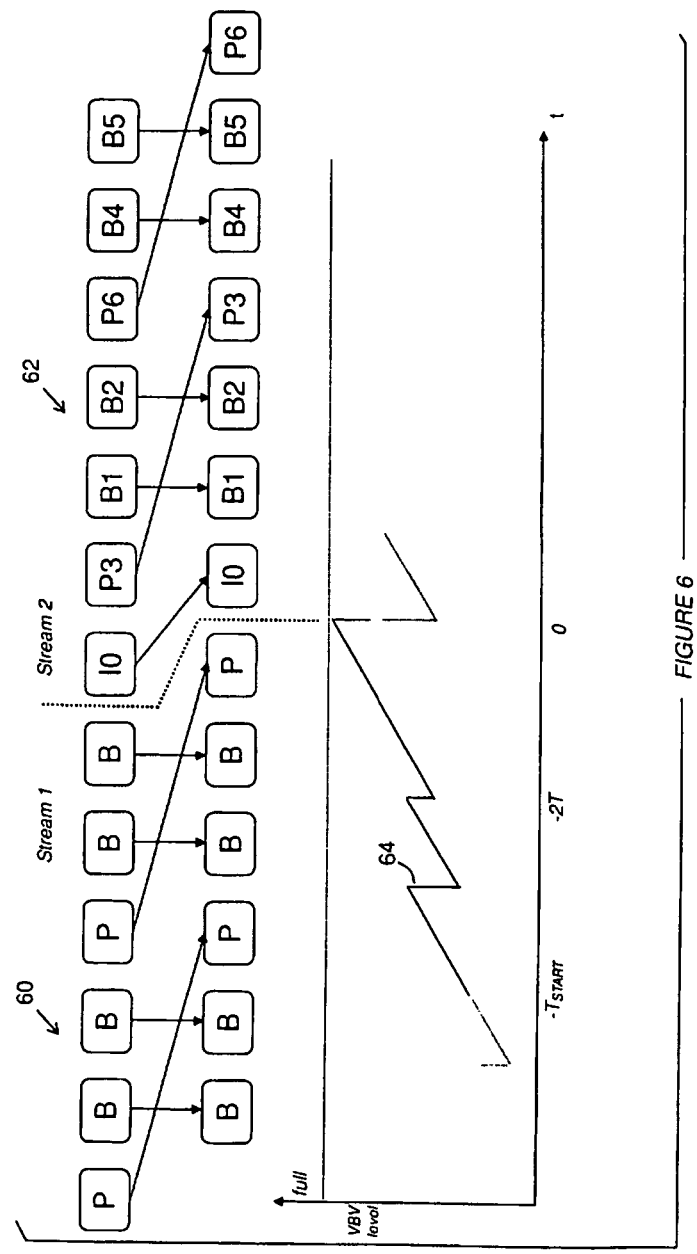
FIG. 6 is a diagram showing a splice from a first stream to a second stream, together with a Video Buffer Verifier (VBV) model representation of the receiver buffer fullness level during the transmission of the first stream.

An example of a splice from an ad stream 60 ("Stream 1") back to a network stream 62 ("Stream 2") is shown in FIG. 6. In this case, the ad is Stream 1 and the network is Stream 2. As before, we assume that the first picture of Stream 2 (I0) will be decoded and displayed at time t=0 shown on timeline 64. Therefore, the splicer must finish sending Stream 1 and begin sending Stream 2 in time to deliver picture I0 in its entirety by the time t=0. Again, we can insure that this constraint is met by assuming worst-case conditions. Specifically, we could assume that picture I0 is large enough to fill up the entire VBV buffer. If we can succeed in filling the buffer prior to the decoding time of I0, then we can assume that our timing is equal to or ahead of the original timing of the network stream. Therefore, no additional constraints will be needed.

If $T_{START}$ is the time required to fill the buffer when starting from an empty state, then:

$$T_{START}=N_{VBV}/r \quad (1)$$

where $N_{VBV}$ is the maximum size of the VBV buffer and r is the available data rate for transmission of this program. In practice, a limit is usually imposed on the maximum delay beginning when an access unit is first inserted into the VBV buffer and ending when the access unit is removed. If such a limit exists and is specified as $T_{MAX}$, then constraint (1) above becomes subject to the following additional constraint:

$$T_{START} \leq T_{MAX} \quad (2)$$

Once the value of $T_{START}$ is determined, then the constraint can be enforced by insuring that the last picture of Stream 1 is fully transmitted by the time $t=-T_{START}$.

Notice from FIG. 6 that adjustments to the buffer occupancy level occur periodically after beginning to send Stream 2 at $t=-T_{START}$. This continues until the last picture of Stream 1 is removed from the VBV buffer at time t=-2T. However, since the last pictures of Stream 1 may be present in the buffer as the level builds due to the transmission of Stream 2, the preprocessor should insure that this additional data does not cause the VBV buffer to become prematurely full. Although this possibility is remote due to the long interval from t=-2T until t=0, the check is easily performed, and the size of these last pictures of Stream 1 can be reduced by recompression if necessary.

In general, it is possible to apply constraint (1) $T_{START}=N_{VBV}/r$ (subject to constraint (2) $T_{START} \leq T_{MAX}$) with minimal impact on video quality. Although the compression ratio of the ad content may need to be increased to insure that this constraint is met, the effect can usually be distributed over most of the ad duration. One of the first steps to achieving this constraint is to discard any null packets which might be increasing the time needed to finish sending Stream 1. However, there is a limit to the amount of ad content which can be recompressed or the number of null packets which can be discarded while attempting to satisfy constraints (1) or (2). If further compression of a portion of the ad would cause the VBV buffer to become full, or the maximum delay $T_{MAX}$ to be exceeded, then there is no reason to recompress any portion of the ad prior to this point. Instead, recompression should be limited to following portions of the ad.

The video degradation resulting from entrance point conditioning is generally limited to the first three pictures of the sequence. Fortunately, the human visual system is relatively insensitive to video fidelity during the interval immediately following a scene change. This effect is known as temporal masking, which is described in greater detail in *Digital Video Image Quality and Perceptual Coding*, Wu and Rao, page 558. Also see B. Girod, *The information theoretical significance of spatial and temporal masking in video signals*, Proc. SPIE International Conference on Human Vision, Visual Processing, and Digital Display, vol. 1077, 1989, pp. 178-187. Experiment shows that full visual sensitivity is not restored until at least 100 milliseconds after the scene change occurs, and by this time, it is quite likely that full quality will be nearly restored by the preprocessing.

Often, ad content will begin with a slow fade from black to a visible image. In such cases, it is unlikely that any of the images will need to be recompressed in order to meet the entrance point preconditioning requirements, and therefore no image degradation will occur. Most other ads, which do not begin with a fade from black, will tend to hold the first image static while the human visual system adjusts to the new scene. During this time, the motion predictive process will be particularly efficient, allowing an accurate reproduction to build up in a relatively short period of time.

The increased compression ratios resulting from exit point conditioning are very slight and are usually distributed over most of the ad content. Therefore, any degradation in video quality due to exit point preconditioning is believed to be insignificant.

There is also an opportunity to improve video coding efficiency during the preconditioning process and this can help to negate any loss in video fidelity due to recompression. For example, H.264 encoding or transrating software can be used to further compress the ads while maintaining full image fidelity. Since there is no real-time re-encoding requirement, the most effective H.264 coding tools available can be combined with highly optimized coding decisions and applied to the ad stream content as a multi-pass process. There is also an opportunity to modify the ad content at the same time in order to better target a specific audience or individual. For example, different ad versions can be created by introducing different overlays. This ad modification process can be implemented much more economically and with superior video quality when performed off-line using optimized software.

Figure 7:
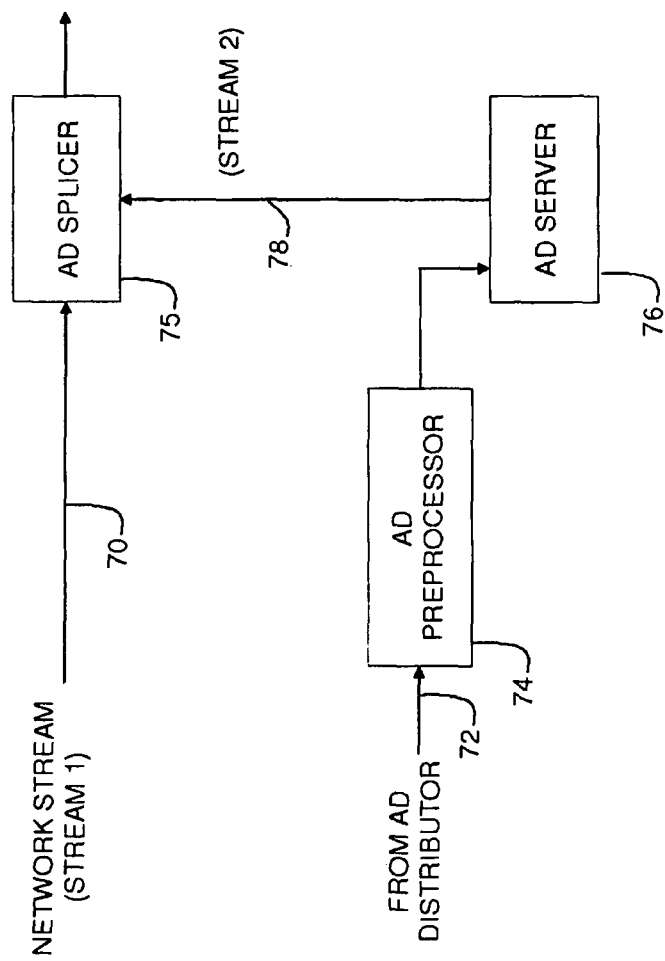
FIG. 7 is a block diagram of apparatus that can be used to implement the invention.

FIG. 7 is a block diagram showing the components of apparatus for implementing the invention. In the example shown in the figure, a network stream ("Stream 1") is provided as input via path 70 to an ad splicer 75. Advertisements from an ad distributor are carried over path 72 to an ad preprocessor 74. The ads are preprocessed as described above (entrance point conditioning and/or exit point conditioning) by the ad preprocessor, and the processed ads are stored in an ad server 76. When needed, a preprocessed ad is provided by ad server 76 to the ad splicer 75 via path 78 ("Stream 2"). The ad splicer splices Stream 1 to Stream 2 as described in detail above, and provides the spliced stream as output to, e.g., a transmitter (not shown).

Figure 8:
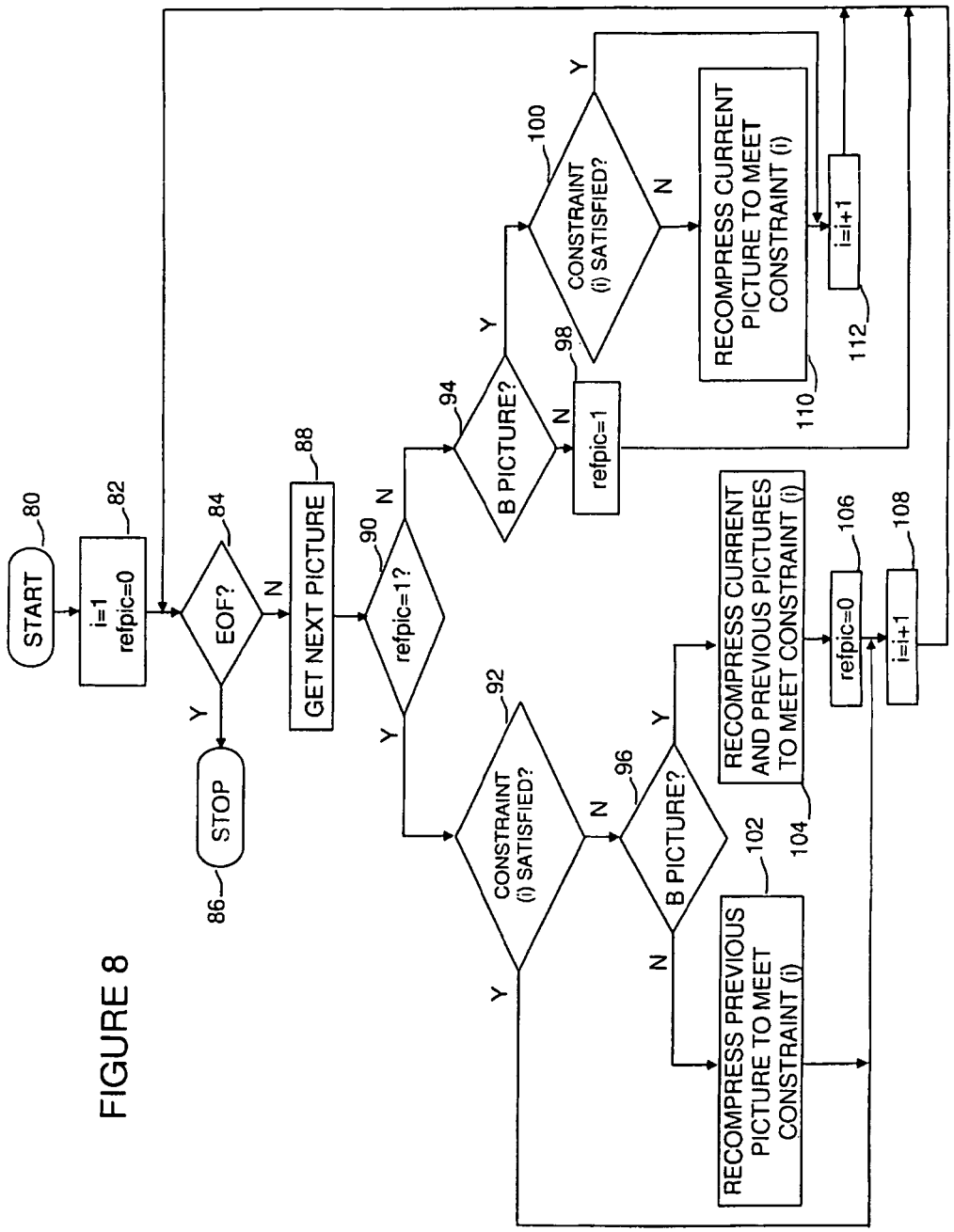
FIG. 8 is a first flowchart detailing an example of software that can be used to implement the invention, e.g., in combination with the apparatus of FIG. 7.
Figure 9:
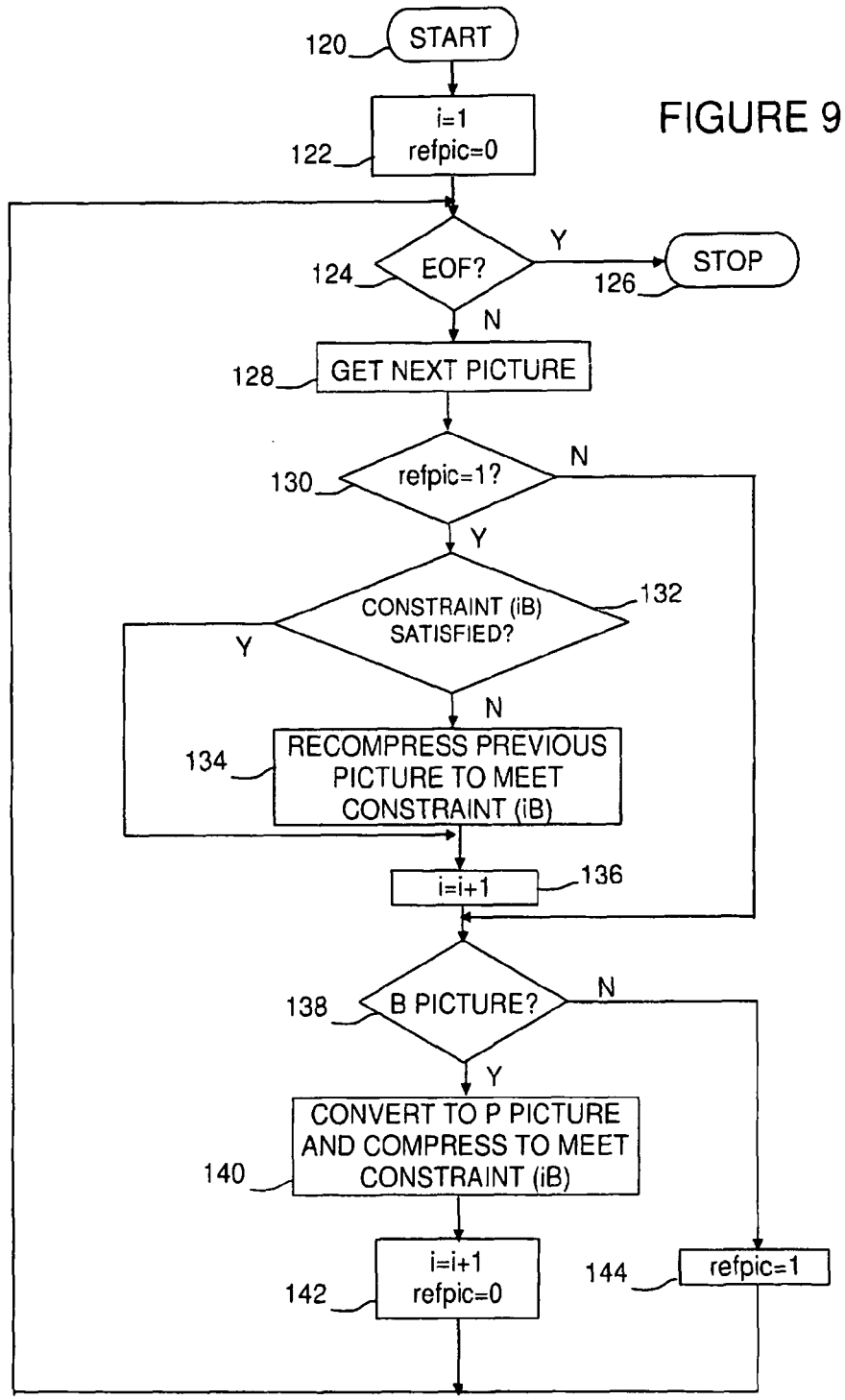
FIG. 9 is a second flowchart detailing an example of software that can be used to implement the invention.

FIGS. 8 to 10 are flowcharts illustrating examples of software that can be used to implement the invention. It should be understood that many other software routines can be developed in accordance with the invention for implementing the methods taught herein.

The flowchart of FIG. 8 provides a routine describing the first set of entrance point conditioning constraints. The routine begins at box 80, and at box 82 the parameter "i" is set to one and the flag "refpic" (i.e., reference picture) is set to zero. At box 84, a determination is made as to whether the end of the stream 2 file ("EOF") has been reached. If so, the routine is stopped at box 86. Otherwise, the next picture is retrieved at box 88. If the refpic flag is equal to one, as determined at box 90, a determination is made as to whether the constraint (i) is satisfied. If so, i is incremented by one at box 108, and the routine loops back to box 84. Otherwise, a determination is made at box 96 as to whether the picture retrieved at box 88 is a B picture. If so, the current and previous pictures are recompressed to meet the constraint (i), as indicated at box 104. Refpic is then set to zero at box 106, i is incremented at box 108, and the routine loops back to box 84.

If it is determined at box 96 that the current picture is not a B picture, then just the previous picture is recompressed to meet the constraint (i), as shown at box 102. The parameter i is then incremented at box 108, and the routine loops back to box 84.

At box 90, if it is determined that refpic is not equal to one, then a determination is made as to whether the current picture is a B picture, as indicated at box 94. If so, then the routine proceeds to box 100 where a determination is made as to whether constraint (i) is satisfied. If the constraint is satisfied, then at box 112 i is incremented by one, and the routine loops back to box 84. Otherwise, the current picture is recompressed to meet constraint (i) at box 110, i is incremented by one at box 112, and the routine loops back to box 84.

In the event that the current picture is not a B picture, as determined at box 94, then at box 98 refpic is set to one and the routine loops back to box 84.

The flowchart of FIG. 9 describes the second (B) set of entrance point constraints (e.g., constraints 1B, 2B, . . . 6B referred to above). The routine starts at box 120, and at box 122 i is set to one and refpic is set to zero. At box 124, a determination is made as to whether an EOF has been reached. If so, the routine stops at box 126. Otherwise, the next picture is retrieved at box 128. If refpic is equal to one in the picture just retrieved, then a determination is made as to whether the constraint (iB) is satisfied. If so, i is incremented by one at box 136. Otherwise, the previous picture is recompressed to meet constraint (iB), at box 134, and then i is incremented by one at box 136.

After i has been incremented at box 136, or if it was determined at box 130 that refpic was not equal to one, a determination is made at box 138 as to whether the current picture is a B picture. If not, refpic is set to one at box 144 and the routine loops back to box 124. If, however, the current picture is a B picture, then it is converted to a P picture and compressed to meet the constraint (iB) as indicated at box 140. Then, i is incremented by one, refpic is set to zero, and the routine loops back to box 124.

The flowchart of FIG. 10 describes the exit point constraint. After commencing at box 150, the latest time to begin sending the next stream ($T_{START}$) is determined at box 152. Then, at box 154, the current stream is examined to determine the time to finish sending the current stream ($T_{END}$). If $T_{END} \leq T_{START}$, as determined at box 156, then the routine is ended at box 178. Otherwise, the variable "k" is set to the number of pictures in the current stream, as indicated at box 158. A determination is then made at box 160 as to whether the picture k includes null packets. If so, the null packets are discarded as shown at box 162, $T_{END}$ is updated at box 164, and at box 166 it is again determined whether $T_{END} \leq T_{START}$. If $T_{END}$ is now less than or equal to $T_{START}$, the routine ends at box 178. Otherwise, the compression ratio for picture k is slightly increased as indicated at box 168, and $T_{END}$ is updated at box 170. Then, at box 172 a new determination is made as to whether $T_{END} \leq T_{START}$. If so, the routine ends at box 178. Otherwise, a determination is made at box 174 as to whether the VBV buffer is full. If so, the routine loops back to box 158. It the VBV buffer is not full, then at box 176 k is decremented by one, and the routine loops back to box 160.

It should now be appreciated that the present invention provides methods for preconditioning content (such as advertisements) and for grooming digital video streams for insertion into network streams and the like carrying digital video programs. It is noted that the foregoing descriptions of specific embodiments of the invention are presented for purposes of illustration and description. They are not intended to be exhaustive or to limit the invention to the precise forms disclosed, and various modifications and adaptations are possible in view of the above teachings. Therefore, it is intended that the invention not be limited to the particular embodiments disclosed herein, but that the invention include all embodiments falling within the scope of the appended claims.

What is claimed is:

1. A method for inserting content into video programming, comprising:
   receiving said video programming in a first video stream comprising a first sequence of pictures;
   receiving said content in a second video stream comprising a second sequence of pictures; and
   preconditioning said second video stream to provide a preconditioned second video stream with an entrance point for splicing the first video stream to the preconditioned second video stream;
   wherein:
      there is no need to precondition the first video stream to perform said splicing;
      said preconditioning of said second video stream occurs prior to said splicing and is independent of any information from the first video stream; and
      said preconditioning step comprises limiting a maximum size of at least a first picture of said content.

2. The method of claim 1 wherein:
said preconditioning step comprises limiting the maximum size of a set of pictures from the sequence of pictures of said content.

3. The method of claim 2 wherein:
said set of pictures comprises a set of consecutive pictures of said second video stream in a predetermined decoding order.

4. The method of claim 3 wherein:
the maximum size of said set of pictures is determined from a number of picture display intervals "T" required to display said set of pictures in a presentation order and an available data rate "r" for transmitting said set of pictures.

5. The method of claim 4 wherein:
the maximum size of said set of pictures is updated after each successive picture and enforced by compressing the next picture of the set of pictures.

6. The method of claim 5 wherein:
said preconditioning step is halted once an occupancy level of a buffer receiving said content is built up to a level that is likely to avoid at least one of an underflow and overflow condition.

7. The method of claim 1 wherein:
each of said pictures is one of an intra-coded (I) picture, a predicted (P) picture, or a bi-directional (B) picture; and
said preconditioning step comprises the steps of:
   converting at least one B-picture to a P-picture following a first I-picture at said entrance point; and
   limiting a maximum size of a set of pictures from the sequence of pictures of said content, where said set of pictures includes said first I-picture and the P-picture converted from said B-picture.

8. The method of claim 7 comprising:
converting a plurality of B-pictures to P-pictures following said first I-picture.

9. The method of claim 8 wherein:
the maximum size of said set of pictures is determined from a number of picture display intervals "T" required to display said set of pictures in a presentation order and an available data rate "r" for transmitting said set of pictures.

10. The method of claim 9 wherein:
the maximum size of said set of pictures is updated after each successive picture and enforced by compressing the next picture of the set of pictures.

11. The method of claim 10 wherein:
said preconditioning step is halted once an occupancy level of a buffer receiving said content is built up to a level that is likely to avoid at least one of an underflow and overflow condition.

12. The method of claim 1 wherein:
the second video stream is received from an encoder that produces predicted (P) pictures instead of bi-directional (B) pictures at a start of said content.

13. The method of claim 1 wherein:
the second video stream comprises a succession of different content streams.

14. A method for inserting content into video programming, comprising:
   receiving said video programming in a first video stream comprising a first sequence of pictures;
   receiving said content in a second video stream comprising a second sequence of pictures;
   preconditioning said second video stream to provide a preconditioned second video stream with an exit point for splicing the preconditioned second video stream to the first video stream at said exit point;
   wherein:
      there is no need to precondition the first video stream to perform said splicing;
      said preconditioning of said second video stream occurs prior to said splicing and is independent of any information from the first video stream; and
      said preconditioning step comprises limiting a maximum size of at least a last picture of said content.

15. The method of claim 14 wherein:
said spliced video streams are communicated to a receiver;
said receiver temporarily stores data from the spliced video streams in a buffer; and
said preconditioning step establishes said exit point based on an amount of time sufficient to substantially fill said buffer with an end portion of said content immediately prior to starting the decoding of a first picture of said first video stream to which the second video stream is to be spliced.

16. The method of claim 15 wherein said amount of time is constrained to not exceed a predetermined maximum value.

17. The method of claim 15, comprising:
determining whether the end portion of said content is likely to overflow said buffer prior to starting said decoding, and if so:
recompressing said end portion to reduce the amount of data therein to an amount that will not overflow said buffer.

18. The method of claim 14 wherein:
said second video stream contains a plurality of different content streams.

19. The method of claim 14 comprising:
preconditioning said second video stream to provide an entrance point in the second video stream for splicing the first video stream to the second video stream.

20. The method of claim 1, wherein:
at least the first video stream is encrypted; and
said splicing occurs without unencrypting at least the first video stream.

21. The method of claim 14, wherein:
at least the first video stream is encrypted; and
said splicing occurs without unencrypting at least the first video stream.

22. The method of claim 1, wherein the preconditioned video stream is stored prior to said splicing.

23. The method of claim 1, wherein:
a pre-processor is provided for said preconditioning of said second video stream;
said preconditioned second video stream is stored at an ad server; and
said preconditioned second stream is provided from the ad server to a splicer, which performs said splicing.

24. The method of claim 14, wherein the preconditioned video stream is stored prior to said splicing.

25. The method of claim 14, wherein:
a pre-processor is provided for said preconditioning of said second video stream;
said preconditioned second video stream is stored at an ad server; and
said preconditioned second stream is provided from the ad server to a splicer, which performs said splicing.

\* \* \* \* \*

UNITED STATES PATENT AND TRADEMARK OFFICE
CERTIFICATE OF CORRECTION

| | | |
|---|---|---|
| PATENT NO. | : 8,904,426 B2 | Page 1 of 1 |
| APPLICATION NO. | : 12/487130 | |
| DATED | : December 2, 2014 | |
| INVENTOR(S) | : Krause et al. | |

It is certified that error appears in the above-identified patent and that said Letters Patent is hereby corrected as shown below:

In the specification

Column 4, lines 40-42: "In accordance with one embodiment of the invention, the entrance point in a first video stream is conditioned for the insertion of a second video stream. Typically, the second"

should read:

-- In accordance with one embodiment of the invention, an entrance point in a second video stream is conditioned to enable the insertion of the second video stream into a first video stream. Typically, the second --

Signed and Sealed this
Twenty-fourth Day of March, 2015

Michelle K. Lee
*Director of the United States Patent and Trademark Office*